May 21, 1968

M. SANDHAGEN 3,384,400

VACUUM-TIGHT CONNECTION BETWEEN A CERAMIC
TUBE AND A DISK-SHAPED METAL PART
OF AN ELECTRICAL DISCHARGE VESSEL
Filed March 23, 1966

INVENTOR
MAX SANDHAGEN

BY *Slice & Slice*

ATTORNEYS

United States Patent Office 3,384,400
Patented May 21, 1968

3,384,400
VACUUM-TIGHT CONNECTION BETWEEN A CERAMIC TUBE AND A DISK-SHAPED METAL PART OF AN ELECTRICAL DISCHARGE VESSEL
Max Sandhagen, Ottobrunn, Germany, assignor to Siemens Aktiengesellschaft, Munich, Germany, a corporation of Germany
Filed Mar. 23, 1966, Ser. No. 537,264
Claims priority, application Germany, Mar. 24, 1965
S 96,140
12 Claims. (Cl. 287—189.365)

ABSTRACT OF THE DISCLOSURE

A vacuum-tight connection for production by butt hard soldering between a ceramic tube forming a part of the tube wall of an electrical discharge vessel and a metal part of generally plate-like form, extending transversely to and projecting beyond the outer circumference of the ceramic tube, and constructed of a material which is not thermally matched to the ceramic, for example, having a greater coefficient of heat expansion, which metal part is directly connected with the ceramic tube and of a thickness and strength which, standing alone would peel from the tube, and a stiffening structure of ring-like configuration disposed opposite the ceramic tube, in abutting relation to said metal part and secured thereto, which stiffening structure is constructed to provide at least one separation in circumferential direction between portions thereof, preferably at least four such separations over a considerable part of the effective radial cross section of the structure, whereby thermal contraction of the portions thereof so separated can take place relatively independently of each other, the material of said stiffening structure having a thermal expansion coefficient which is at least equal to that of the metal part, and which is produced first placing on the metalized annular end face of the ceramic tube the metal to be soldered thereto, assembled the stiffening structure thereupon, in each case interposing a suitable hard-soldering agent between each pair of surfaces to be soldered, and thereafter simultaneously soldering the assembly into a unitary structure by a single soldering operation.

---

The invention relates to a vacuum-tight connection, produced by butt hard soldering between a ceramic tube, forming a part of the tube wall of an electrical discharge vessel, and a metal part which at least in the area of the soldered joint, is flat, extending substantially perpendicular to the tube axis, in the manner of a plate, annular disk or the like serving as an electrode terminal or support, in particular projecting beyond the outer circumference of the ceramic tube, and made of a material not thermally matched to the ceramic, for example, having a greater heat expansion coefficient and having on its side facing away from the ceramic tube a reinforcing ring, mounted in opposition to the ceramic tube. The invention is of special importance for use in power tubes of all kinds, also, among others, for those which are constructed as traveling wave tubes.

In the construction of the tube wall of an electric discharge vessel of, for example, ceramic tube parts and substantially disk-shaped metal parts alternately soldered together, the metals most generally utilized in tube construction, such as, for example, copper, nickel and the like, are not matched to the ceramic involved with respect to the heat expansion coefficient. With ceramic tube parts soldered on both sides of a metal disk after corresponding metalizing, no particular difficulties occur with respect to the shear forces, arising during cooling following in the soldering operation, at the soldered surfaces metalization surface) are distributed over two cross-sections throughout the entire soldering area. However, with a one-sided butt soldering connection, if a metal part of relatively great thickness is employed, the ceramic tube concerned, in consequence of too high bending strain, is fractured or, if a thin metal disk or plate is employed, the latter is detached from the ceramic tube by reason of a peeling action. Using a correspondingly dimensioned metal part for the connection, whose characteristics would fall between the two situations just described, would create a considerable uncertainty with respect to the reliability of its discharge vessel involved, and, therefore, such a dimensioning would not be practical in high value tubes.

The problem underlying the invention consists therefore in making possible, through a special design of the metal part of a vacuum-tight connection produced by butt hard soldering to a ceramic tube, the use of generally utilizable metals that have proved successful in tube construction, thereby creating conditions for a connection which is reliably and technically simple to produce, and especially well suited for mass production.

This is achieved, according to the invention, in a vacuum-tight connection produced by butt hard soldering, as initially described, between a ceramic tube forming a part of the tube wall of an electrical discharge vessel and a disk-like metal part, by an arrangement in which the metal part, directly connected with the ceramic tube, has a thickness and strength generally corresponding to that of a clamped-in plate which, standing alone, would peel from the tube, and is therefore provided opposite the ceramic tube with a reinforcing ring or assembled parts disposed in ring formation, which are arranged in the manner of a counter-ring having the approximate dimensions of the soldered plate, in which the ring, if of integral construction, is provided with interrupting notches or bends, at least one, preferably at least four times, over a considerable portion of its radial cross-section, and has a heat expansion coefficient which is equal to or greater than that of the metal part.

Through this arrangement, in which in an advantageous manner the selected thickness of the so-called stiffening ring is at least equal to that of the metal part to be reinforced, such reinforced metal part is so rigid in the zone of the ceramic-metal juncture that it can no longer peel. It is advantageous to produce the so-called stiffening ring from the same metal as the metal part to be reinforced thereby and assembled thereto by metal soldering. Because of the especially favorable physical and mechanical properties it is possible to use, to particular advantage for the solution of the problem, copper and nickel. The stiffening ring can thus be produced from a metal whose heat expansion coefficient is either equal to or greater than that of the metal part to be reinforced. The annular connection of the reinforcing ring can be directly interrupted, for example, by notches, or indirectly in its action through bends, in such a way that the ceramic tube involved will not be broken during cooling.

There is already known, in a multi-chamber clystron, a vacuum-tight connection between a tubular ceramic member and a disk-like metal member, in which a thin walled part of the metal member is constructed as an annular flange and is provided at the side opposite the end face of the ceramic tube with a ceramic ring so that, upon thermal load, the relatively thick metal plate forming the actual closure of the discharge vessel can slide relative to the ceramic ring. Since in this known arrangement, in contrast to the connection according to the invention, the metal part sealing off the discharge vessel is of very thick-walled construction, it absolutely must have in addition a thin-walled part, on which there is soldered, following a corresponding metalizing, a sufficiently thick ceramic ring.

Further details of the invention will be explained with the aid of several examples of construction, illustrated purely schematically in the figures, and in which part, such as for example, the electrode system or the discharge vessel, are omitted. In the drawing, wherein like reference numerals indicate like or corresponding parts:

Figure 1:
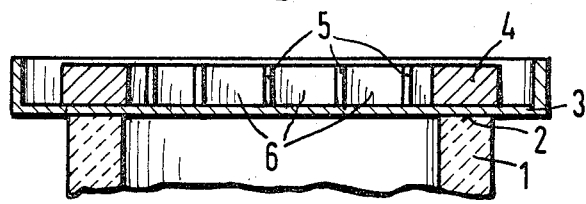
FIG. 1 is a sectional view of a portion of a ceramic tube comprising a part of the discharge vessel.
Figure 2:
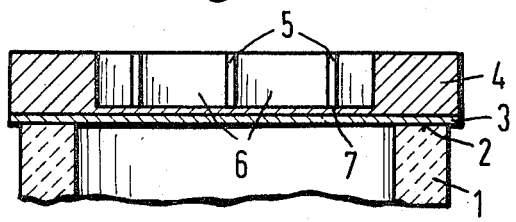
FIG. 2 is a sectional view, similar to FIG. 1, of a modified construction, utilizing a connection plate or web.

Referring to FIG. 1, the reference numeral 1 designates a ceramic tube representing a part of the wall of the discharge vessel, on whose end face 2 there is butt-hard-soldered, following corresponding metalization of the ceramic tube, a metal part 3 representing a closure. The metal part 3 is relatively thin-walled, projects beyond the circumference of the ceramic tube and is provided with a cylindrical rim which extends perpendicularly thereto in the longitudinal direction of the tube axis, as is provided, for example, when the metal part involved is utilized simultaneously as a contacting lead-through plate, for example, in a disk tube. At the side of the metal part provided with the cylindrical rim there is disposed, opposite the end face of the ceramic tube, a ring-like stiffening structure 4, having a width corresponding approximately to the thickness of the ceramic tube and a thickness which is at least greater than that of the metal part itself. The stiffening ring 4 is provided with radial separations or notches 5, so that the ring, basically very stiff, consists of a plurality of individual segments 6 which in cooling, for example, from soldering temperature, no longer can contract as a rigid, solid entity and thus cannot exert any destructive shear forces on the soldered joint. On the other hand, however, the thin-walled metal part cannot peel up, becaues the rigid soldered-on segments prevent it from so doing. The ring segments can be held for the soldering operation with a suitable gauge. This, however, is unnecessary in the example of construction illustrated in FIG. 2 inasmuch as the individual segments 6 are held together during the soldering by an end face sheet 7, which as illustrated, may be provided on the underside, or also on the upper end face. In the latter case, if necessary, it can subsequently be cut through, so that no direct connection exists betwen the respective individual segments except at the soldered joints.

Figure 3:
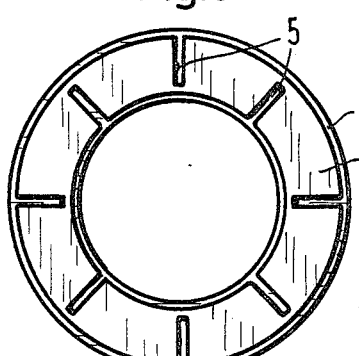
FIG. 3 is a top plan view of a ring construction having alternating external and internal radially extending notches.

FIG. 3 illustrates another example of a ring-like stiffening structure 4 subdivided into segments, in which in contrast to the preceding examples, a certain coaction is achieved through the fact that the notches 5 in the ring do not extend all the way therethrough, but are alternately introduced in the ring from the interior and exterior thereof.

Figure 4:
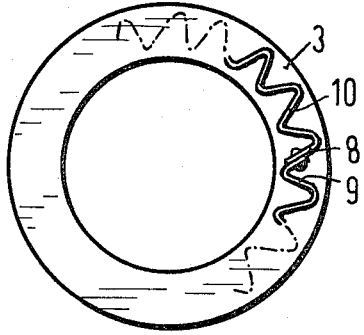
FIG. 4 is a view similar to FIG. 3, illustrating the use of a corrugated ring.
Figure 5:
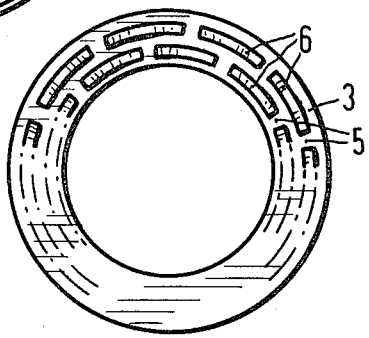
FIG. 5 is a view similar to FIGS. 3 and 4, illustrating the use of arcuately shaped segments.

In the examples of construction thus far described, the stiffening ring involved has, in each case, been subdivided into segments by a mechanical machining, which, however, involves a certain expenditure reflected in the cost of manufacture of the particular tube concerned. FIGS. 4 and 5 illustrate inexpensive forms, suitable for mass production, of corresponding stiffening structures. In FIG. 4, for example, a metal band, transversely corrugated throughout its length is bent into a ring suitably held together or mechanically connected at its two adjoining ends 8 and 9. Such ring has its one edge face hard soldered to the underlayer metal plate 3, constructed as an annular plate, for the achievement of the requisite stiffness thereof. Contracting forces arising in the cooling process cannot, therefore, in this form of construction, have a troublesome effect on the soldered connection, because these are absorbed by the individual corrugated elements through corresponding elastic deformations.

A technically still simpler and cheaper form to manufacture of a so-called stiffening ring is illustrated in FIG. 5, in which the ring-like structure comprises a plurality of arcuate segments 6 of a circular metal band which are assembled on a circle or on two concentric circles with their edge faces soldered to the plate 3 with open gaps 5 remaining between adjacent sections. In the soldering of a stiffening ring subdivided in this manner it, of course, may be necessary to support the band sections in a suitable gauge.

Through modification in the shape of the sections concerned it is possible to produce other suitably formed so-called stiffening rings which enable utilization of very inexpensive manufacturing techniques.

The primary advantage of the described constructions is that a complete freedom exists in the selection of the metal for the metal-ceramic connection, and that as a result of the metal-soldering thereby made possible, completely reliable results are achieved even in mass production.

Changes may be made within the scope and spirit of the appended claims which define what is believed to be new and desired to have protected by Letters Patent.

I claim as my invention:

1. In a vacuum-tight connection for production by butt hard soldering between a ceramic tube forming a part of the tube wall of an electrical discharge vessel and a metal part extending, at least in the area of the soldered joint, substantially perpendicular to the tube axis, with such metal part of generally plate-like form having a desired configuration and adapted to serve as an electrode connection or support, said metal part projecting beyond the outer circumference of the ceramic tube and constructed of a material which is not thermally matched to the ceramic, for example, having a greater coefficient of heat expansion, the combination of such a metal part, directly connected with the ceramic tube and of a thickness and strength which, standing alone would peel from the tube, and a stiffening structure of ring-like configuration disposed opposite the ceramic tube, in abutting relation to said metal part and secured thereto, said stiffening structure being constructed to provide at least one separation in circumferential direction between portions of said structure, preferably at least four such separations over a considerable part of the effective radial cross section of the structure, whereby thermal contraction of the portions thereof so separated can take place relatively independently of each other, the material of said stiffening structure having a thermal expansion coefficient which is at least equal to that of the metal part.

2. A vacuum-tight connection, according to claim 1, wherein the thickness of stiffening structure in the direction of the tube axis is at least equal to that of the metal part to be reinforced thereby.

3. A vacuum-tight connection, according to claims 1 and 2, wherein the stiffening structure consists of the same metal as the metal part to be reinforced thereby and has a hard-solder joint therebetween.

4. A vacuum-tight connection, according to claims 1 to 3, wherein the stiffening structure and the metal part reinforced thereby consist of copper, nickel or other common metal with similar physical properties.

5. A vacuum-tight connection, according to claims 1 to 4, wherein the stiffening structure comprises a multible bent metal band particularly having a series of corrugations formed therein.

6. A vacuum-tight connection, according to claims 1 to 4, wherein the stiffening structure comprises several sections of metal band bent into circular segments and arranged in a circle, particularly in two concentric circles.

7. A vacuum-tight connection, according to claims 1 and 2, wherein the stiffening structure and metal part to be stiffened thereby are formed from a single piece of material.

8. A vacuum-tight connection, according to claim 7, wherein the separations between the respective portions of said stiffening structure are of a width up to approximately the thickness of said metal part and do not extend quite all the way through the structure, leaving a circular ring-shaped surface which is secured to the metal part.

9. A vacuum-tight connection, according to claim 7, wherein the separations between the respective portions of said stiffening structure are of a width up to approximately the thickness of said metal part and alternate from the radially inner and outer sides of the stiffening structure, with such separations extending not quite completely radially through the structure forming a meandering pattern at the soldering joint between such structure and the metal part.

10. A method of producing a vacuum-tight butt hard-soldered connection between a ceramic tube forming a part of the tube wall of an electrical discharge vessel and a metal part extending, at least in the area of the soldered joint, substantially perpendicular to the tube axis and to be directly connected to the tube, with such metal part being of generally plate-like form having a thickness and strength which standing alone would peel from the tube, and constructed with a desired configuration of a material which is not thermally matched to the ceramic, and a stiffening structure of ring-like configuration disposed opposite the ceramic tube in abutting relation to said metal part and to be secured thereto, said stiffening structure being constructed to provide at least one separation in a circumferential direction between portions of siad structure, the material of said stiffening structure having a thermal expansion coefficient which is at least equal to that of the metal part, comprising the steps of first placing on the metallized annular end face of the ceramic tube the metal part to be soldered thereto, assembling the stiffening structure thereupon, in each case interposing a suitable hard-soldering agent between each pair of surfaces to be soldered, and thereafter soldering the assembly into a unitary structure.

11. A method according to claim 10, wherein the ceramic tube metal part and stiffening structure are similarly soldered into a unitary structure by a single soldering operation.

12. A method, according to claim 11, wherein each circumferential separation between portions of said stiffening structure is made just wide enough that in the soldering process no soldering takes place between adjacent separated portions of the stiffening structure.

References Cited
UNITED STATES PATENTS

| | | | |
|---|---|---|---|
| 2,604,229 | 7/1952 | Schwarz | 287—189.365 |
| 2,650,683 | 9/1953 | McPhee et al. | 287—189.365 |
| 2,756,361 | 7/1956 | Germeshausen | 287—189.365 |
| 3,171,519 | 3/1965 | Nolte | 287—189.365 |

MARION PARSONS, JR., *Primary Examiner.*